Fig. 1

Dec. 9, 1969   O. SEPALL ET AL   3,483,078
APPARATUS FOR PRODUCING TEST SHEETS FROM PAPERMAKING PULPS
Filed April 18, 1966                     12 Sheets-Sheet 2

INVENTOR
Ola Sepall
Leonard N. Stanner
BY Bruno Tremblay

Weir, Marshall, MacRae & Lamb
PATENT AGENT

Dec. 9, 1969 O. SEPALL ET AL 3,483,078
APPARATUS FOR PRODUCING TEST SHEETS FROM PAPERMAKING PULPS
Filed April 18, 1966 12 Sheets-Sheet 12

INVENTOR
Ola Sepall
Leonard R. Starr
BY Bruno Tremblay
Weir, Marshall, MacRae &
PATENT AGENT Lamb

# United States Patent Office 3,483,078
Patented Dec. 9, 1969

3,483,078
APPARATUS FOR PRODUCING TEST SHEETS FROM PAPERMAKING PULPS
Ola Sepall, Leonard N. Stanners, and Bruno Tremblay, Quebec, Quebec, Canada, assignors to Anglo Paper Products, Limited, Quebec, Quebec, Canada
Filed Apr. 18, 1966, Ser. No. 543,320
Claims priority, application Canada, Jan. 24, 1966, 950,564
Int. Cl. D21f 1/08
U.S. Cl. 162—252    3 Claims

ABSTRACT OF THE DISCLOSURE

The invention relates to a method and means for evaluating papermaking pulps. A test sheet is produced from each of a number of separate samples of pulp stock. Each sample is carefully isolated from the remaining samples. A fixed measured volume of stock is removed from each sample and is placed over a sheet forming screen. The entire amount of the fixed volume of stock is then deposited onto the screen for water drainage therethrough and formation of a paper web thereon.

---

This invention relates to an apparatus for evaluating papermaking pulps and, more particularly, to an apparatus for producing handsheets from pulps for physical testing thereof.

The importance of routine evaluation of the physical properties of papermaking pulps was recognized many years ago. Such routine evaluation helps to provide knowledge of the papermaking qualities of pulp and gives information as to the strength characteristics imparted to paper by various pulps.

Pulp evaluation methods, and apparatus therefor, have become rather closely standardized in most major pulp and paper manufacturing countries. In general principle, they consist of making and testing handsheets under controlled conditions. The procedure entails the following five main steps, (i) Sampling and preparation of the pulp for sheetmaking,
(ii) Forming of the sheet on a wire,
(iii) Couching the wet web from the wire onto blotters,
(iv) Wet pressing of the sheet for water removal, and
(v) Drying and conditioning the sheet prior to testing.

This procedure, as presently practiced, is often inefficient, tedious and detrimental to the provision of accurate test results. For example, step (ii) may frequently lead to variations in properties (such as weight, formation, and the like) from sheet to sheet due to human error. Different operators, under the same conditions, will produce sheets of varying characteristics. Another disadvantage resides in the fact that sheets produced from certain types of pulp (such as groundwood and mechanical) tend to stick to the wire and thus it is difficult to couch the sheets. As a result, the operator must lift the sheet with his hands and this action may affect the characteristics of the sheet. Moreover, the standard technique for forming and couching the wet web is tedious, time-consuming and costly.

It is a general object of this invention to provide an apparatus for forming handsheets in an efficient and accurate manner.

A more specific object is to provide an apparatus for forming handsheets which accurately represent the paper quality and characteristics of the pulp employed whereby variations in sheet characterstics as a result of human error and the like are substantially avoided.

Another object is to provide an apparatus for forming and couching handsheets from all types of pulp including those which normally present couching difficulties.

Another object is to provide an apparatus for forming and couching handsheets in a substantially automatic manner with a minimum of direct human contribution whereby such handsheets may be produced in a less costly and more efficient manner.

Another object is to provide an apparatus for forming and couching a preselected number of handsheets from a given sample of pulp in an automatic manner.

The invention will be described with reference to the accompanying drawings, in which
FIGURE 12 is a plan view, in partly diagrammatic form, of a portion of a modified machine in accordance with the invention.

Referring to FIGURES 1 to 11 of the drawing, the apparatus illustrated comprises a housing or cabinet 1 which may be provided with casters 2 for ease of movement thereof.

Figure 1:
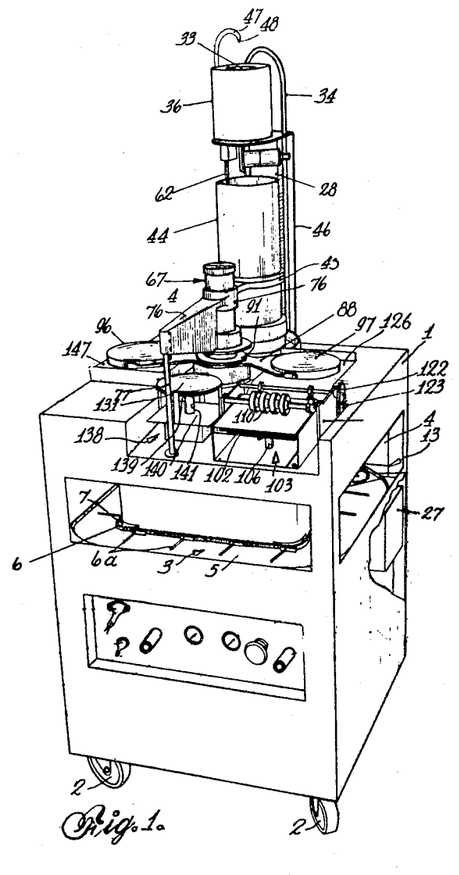
FIGURE 1 is a perspective view of an apparatus in accordance with the invention.
Figure 2:
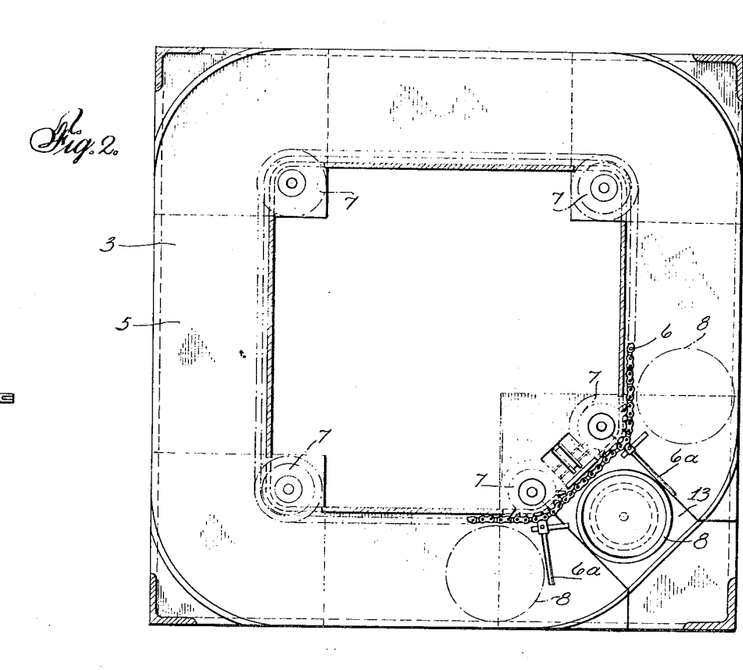
FIGURE 2 is a sectional plan view showing a conveyor means.
Figure 3:
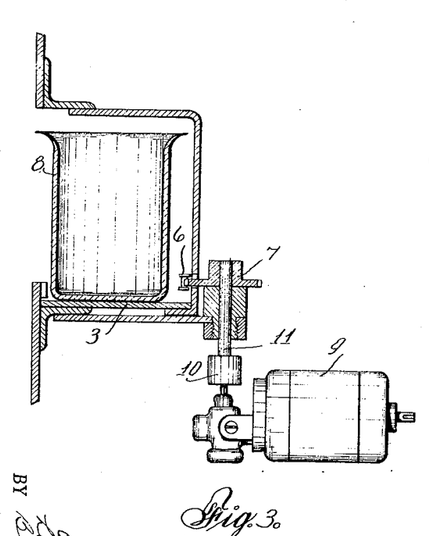
FIGURE 3 is a section on line 3—3 of FIGURE 2.

Means are provided for successively treating a plurality of pulp samples and such means comprises a platform 3 fixedly mounted in the housing and accessible through side wall openings 4. The platform has a recessed endless surface 5. An endless conveyor comprises a chain 6 mounted on sprockets 7 and carrying a plurality of pushing arms 6a arranged to sweep the surface 5. One or more containers or beakers 8, each containing a sample of pulp to be tested, are adapted to be placed on the surface 5, each beaker being placed between a pair of adjacent arms 6a. It will be apparent that, on engagement of each beaker by an arm 6a, it will be pushed along surface 5.

The conveyor is driven in any suitable manner as by means of an electric motor 9 having a driving connection 10 with the shaft 11 of a sprocket 7.

Means are provided for dumping the stock from each beaker for formation of a sheet therefrom at a specified location. To this end, and referring to FIGURES 1 and 4, a dumping device 12 comprises a dumping section 13 of platforms 3 hingedly mounted on a pin 14. When the beaker arrives on section 13, it is firmly held thereon by means of vacuum in a chamber 15 under the bottom wall of the beaker and formed in part thereby. A circular rubber or like ring 16 under the beaker acts to seal the vacuum in chamber 15. Vacuum is applied through a line 17 communicating with the chamber. Electrical means for causing a vacuum pump to evacuate chamber 15 includes a switch 18 and switch actuating arm 19 engaged by the beaker when it moves onto section 13. Switch 18 also acts to stop the conveyor drive as well as to initiate an ensuing series of operations.

Figure 4:
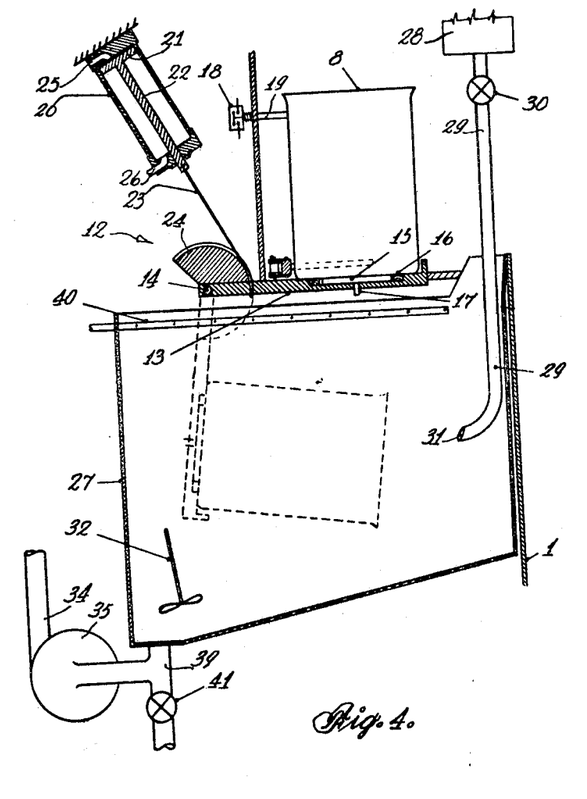
FIGURE 4 is a sectional elevation of a dumping device.

Means for swinging platform section 13 and the beaker thereon downwardly to discharge the contents of the beaker comprises an air cylinder 20 having a piston 21 therein and a piston rod 22. A flexible line 23 connects the piston rod with the section 13. For ease of operation, the line 23 may be trained over a segment 24 mounted on section 13. The piston 21 is reciprocated by air pressure applied to either side thereof through air connections 25 and 26. Air pressure normally acts on the lower side of the piston to maintain the section 13 in the plane of platform 3. This pressure is now released to cause downward movement of section 13 into a tank 27 mounted in housing 1 beneath the section. As shown in FIGURE 4, this action dumps the contents of the beaker into tank 27.

Means are provided for adding dilution water to the stock in tank 27. Such means comprises a dilution water container 28 having a pipe 29 extending into tank 27 and through which water is fed by gravity on opening of a valve 30 therein. This valve automatically opens during the emptying operation of beaker 8. Pipe 29 terminates in a spout 31 immediately in front of the beaker mouth when the latter is in dumping position. This dilution water serves to flush the beaker of pulp and to dilute the pulp sample in the tank to desired consistency. An agitator 32 may be provided in tank 27 to provide mixing of the suspension therein and to ensure against settling of fibres. Container 28 is automatically filled with clean water to a constant volume during the draining and washing cycle of tank 27.

After dumping and flushing of beaker 8, pressure is again applied to piston 21 to return the dumper section 13 and the empty beaker to their original position. This action again trips switch 18 which de-energizes the dumping and diluting portion of the electrical circuit and initiates the sheet forming procedure. This second tripping of switch 18 also starts conveyor 6 which pushes the empty beaker off dumper 13 and positions the following beaker on the dumper in readiness for a second sample dumping. The latter dumping occurs only when the previous sample in tank 27 has been consumed in sheetmaking.

The diluted pulp in tank 27 is transferred into a measuring pot 33 mounted on the housing through a pipe 34 by means of a pump 35. Pot 33 (see FIGURE 5) is located concentrically within an overflow vessel or receiver 36. The volume of pot 33 may be controlled whereby it can be made to contain a precisely determined volume of suspension by means of an adjustable sleeve 37 mounted on the mouth edge portion of the pot. The pumping cycle is of sufficient length always to transfer a volume of suspension greater than can be contained within pot 33. This results in an overflow from the pot into receiver 36 and ensures a reproducible and complete filling of the pot. The suspension overflowing into receiver 36 is returned by gravity to tank 27 through a drain pipe 38.

Figure 5:
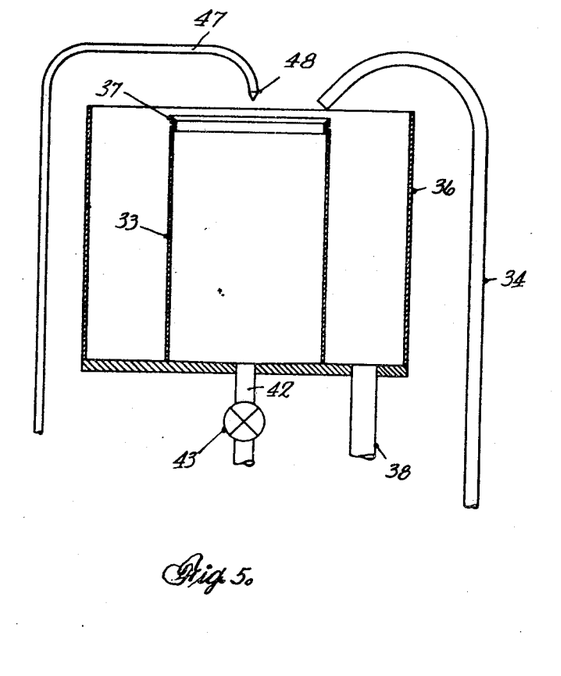
FIGURE 5 is a sectional elevation of a measuring pot and related elements.

The remainder of the sample in tank 27 is discharged to waste through a drain pipe 39 and tank 27 is thoroughly washed by spraying clean wash water onto the interior walls thereof by means of a spray shower pipe 40. The wash water is discharged by gravity through pipe 39. A valve 41 in pipe 39 automatically opens on completion of the pumping step and closes on completion of the washing step. It will be apparent that, in any sequence of sheetforming steps, this washing of tank 27 will be the initial step, on energization of the machine, to ensure accurate results.

The fixed volume of suspension in measuring pot 33 is adapted to be emptied by gravity through a pipe 42 having an open-ended valve 43 therein into a cylindrical sheetmaking member 44 located directly below the pot and carried by an arm 45 fixed to a central column 46 mounted on the housing. During the emptying of pot 33, a spray of clean water is directed onto the walls of the pot, by means of pipe 47 and nozzle 48, in order to flush off adhering pulp fibres.

The actual handsheet forming device employed in the present invention is of generally conventional type but forms an automatically operating portion of the invention. The device, shown in FIGURES 6 and 7, comprises the member 44, previously mentioned, a grid plate 49 with wire 49a thereon disposed below the lower open end of the member, and a circular base 50 on which the grid plate is supported. Base 50 has a funnel-shaped depression or drainage chamber 51 therein disposed directly below grid plate 49 and an annular peripheral trough 52 located radially outwardly of the wall of member 44. A drainage pipe 53, having a valved air inlet 54, a valved water intake or water supply pipe 55, and a drainage pipe valve 56 therein, leads from the funnel depression or drainage chamber 51 into an overflow vessel 57 located in a sump 58. Drain pipes 59 lead from the trough 52 into the sump. A resilient gasket ring 60 provides sealing means at the lower edge portion of member 44. A baffle 61 is located in the funnel depression or drainage chamber 51 and the grid plate 49 is seated thereon.

Figure 6:
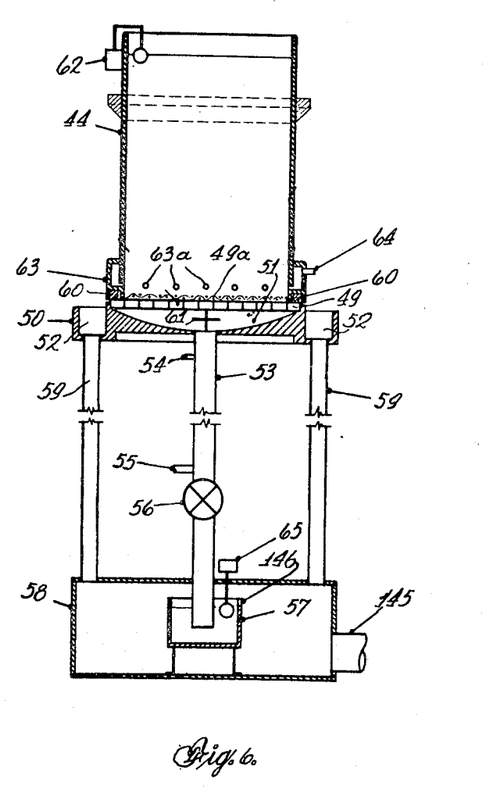
FIGURE 6 is a sectional elevation of a sheet forming device.

In order to provide desired control in operation of the device, member 44 is provided with a liquid level control 62 and an annular air manifold 63 surrounding the lower end thereof. Manifold 63 has an air intake or air supply pipe 64 and a plurality of air outlet holes 63a leading into the member. Overflow vessel 57 is provided with a drainage determination detector 65.

Figure 7:
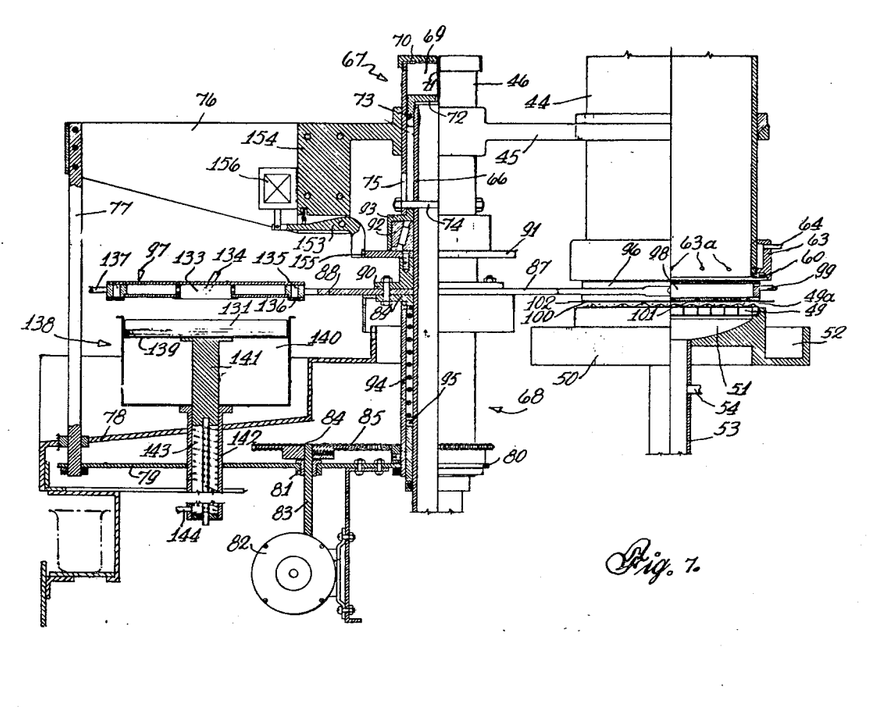
FIGURE 7 is a sectional elevation of the column and associated elements.

Column 46 is a hollow cylinder mounted for raising and lowering movement on a center pipe 66 and has an upper section 67 (to which arm 45 is fixed) non-rotatively mounted on the pipe and a lower section 68 rotatively mounted on the pipe.

Lifting action is applied to the column by means of air pressure applied through pipe 66. The air under pressure is transmitted to a chamber 69 at the top of the column (which is closed by a cap 70) through a hole 71 in a seal holding cap 72 fixed to the top of pipe 66 and provided with a sealing ring 73. The amount of lifting movement of column 46 is controlled by a stationary stop pin 74 fixed to pipe 66 and extending through a slot 75 in the wall of column 46.

Fixed to column section 67 is an arm 76 which, as shown, extends in diagonally opposed relation to arm 45. A guide rod 77 fixed to arm 76 extends downwardly therefrom through a frame member 78 fixed to the housing. Fixed to guide rod 77 is a motor mounting plate 79 which is also supported on column section 68 as by a ring 80. Suspended from plate 79 as by a bracket 81 is a motor 82 arranged to drive a shaft 83 extending through plate 79. Shaft 83 drives a sprocket 84 and by means of chain 85 and sprocket 86 imparts rotation to column section 68.

Fixed to the upper end of section 68 are a pair of diagonally extending arms 87 and 88 by means of flanged collars 89 and 90. A disk 91 is fixed to the top edge of collar 90. A bearing 92 in housing 93 is mounted on disk 91. A coil spring 94 between column section 68 and pipe 66 and having its ends bearing on a sleeve 95 at the lower end of section 68 and collar 89 serves to urge section 68 upwardly towards section 67.

Arm 87 carries a couching head 96 and arm 88 carries a plate transfer head 97.

Couching head 96 comprises a shallow cylindrical housing having a chamber 98 therein to which vacuum may be applied through a flexible hose 99. The bottom wall 100 of the head has perforations 101 therein whereby, when chamber 98 is under vacuum, a porous medium such as an absorbent paper sheet or blotter 102 applied to the outer face of wall 100 will be held thereon.

Figure 8:
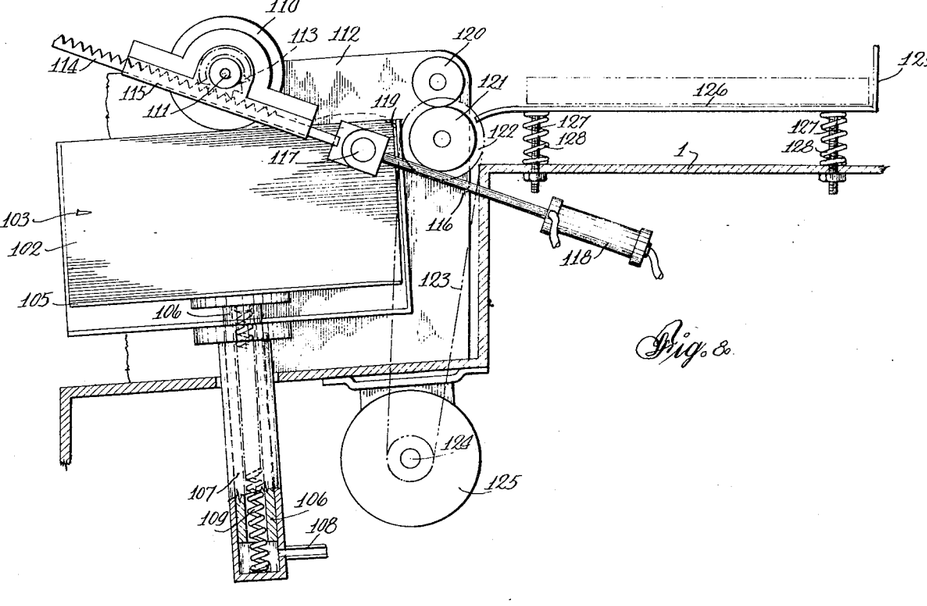
FIGURE 8 is a sectional elevation of a blotter feeding device.

A blotter separator and feeding device is provided and one suitable modification thereof is shown in detail in FIGURE 8 and comprises a compartment or tray 103 mounted on the top of cabinet 1 and adapted to contain a stack of blotting sheets 102 which, as shown, are of square shape. The stack sits on a table 105 which is supported on a piston 106 in a cylinder 107 having an air intake 108. A tension spring 109 located inside the piston has one end attached to the base of cylinder 107 and the other end attached to table 105. The top of the stack is engaged by friction wheels 110. The spring 109 serves to maintain a constant pressure of the stack against wheels 110 as blotters are removed from the stack. The level of pressure of the blotter stack against wheels 110 is governed by air pressure applied to cylinder 107 through intake 108.

Means for separating the topmost blotter from the stack and initiating movement of it from the stack comprises the friction wheels 110 which are fixed to shaft 111 mounted in frame members 112. Rotation is imparted to the wheels 110 by means of a ratchet drive comprising a ratchet wheel 113 fixed to shaft 111, a ratchet bar 114 mounted in a support 115, a piston rod 116 pivotally connected to ratchet bar 114 at 117 and an air cylinder 118 for imparting movement to the bar 114.

Positive separation of the topmost blotter from the underlying one is achieved by means of filled corners 119, which cause the topmost blotter to bulge upwardly and away from the underlying one under the action of the wheels 110 (as shown in dotted lines in FIGURE 8). After a certain degree of bulge, the leading edge of the topmost blotter pops out of compartment 103 and, under further action of wheels 110, is pushed into the nip of a pair of rollers 120 and 121. These latter rollers have surfaces of friction material such as rubber. Roller 121 is driven by means of a pulley 122, belt 123, pulley 124, and motor 125. Rollers 120 and 121 deposit the blotter engaged thereby onto a feeding table 126 which is resiliently supported on the cabinet by means of legs 127 and springs 128. The table has a stop 129 to position the blotter thereon.

Plate transfer head 97 comprises a shallow cylindrical member having in its lower surface a circular recess 130 adapted to receive a metal plate 131 from an underlying stack of such plates. Plate 131 is a smooth faced imperforate metal disc. Suitably it is of mirror-finished stainless steel. Each plate 131 fits snugly into recess 130 with its under surface substantially flush with the surrounding annular surface 132 of the head.

Means for holding plate 131 in recess 130 comprises a chamber 133 axially disposed in head 97 and to which vacuum may be applied through flexible hose 134.

Head 97 is also provided with an annular chamber 135 with communicating perforations 136 leading from surface 132. Vacuum may be applied to chamber 136 by means of flexible hose 137.

A plate feeder 138 comprises a table 139 adapted to support a stack of plates 131, a compartment 140 having walls serving to retain the plates of the stack in proper alignment, a piston 141 carrying the table 139, a cylinder 142 receiving the piston for reciprocal movement therein, a spring 143 in the cylinder resiliently supporting the piston, and an air intake 144 leading into the cylinder below the piston.

Also mounted on the top of the cabinet (see FIGURES 1 and 9) is a sheet stacking compartment 147 having therein a stacking table 148 carried by a rod 149, the lower end of which extends into a cylinder 150 and is spring-loaded therein by means of a spring 151. The spring loading arrangement is designed to minimize free fall distance of blotters and plates into the compartment to provide neat stacking. The motion of rod 149 is damped by friction from a compressed O-ring 152 to prevent oscillation of the rod and table.

Referring to FIGURE 1, it will be observed that there are four circumferentially arranged step-performing stations associated with rotative movement of the couching head 96 and the plate transfer head 97. These are (1) blotter feeding table 126, (2) couching location in alignment with member 44, (3) sheet stacking location in alignment with compartment 147, and (4) plate feeding location in alignment with plate feeder 138. As shown, stations (1) and (3) are in diametrically opposite relation and stations (2) and (4) are in diametrically opposite relation. In the position of FIGURE 1, couching head 96 is located in station (1), that is, directly over blotter feeding table 126 and plate transfer head 97 is in station (3); that is, directly over compartment 147.

Continuing with the operative description of the apparatus with particular reference to the elements thus far set forth, it may be assumed that the open-ended cylindrical member 44, at the beginning of the sheet forming operation, is in the raised position shown in FIGURE 7, that is, with the bottom thereof approximately one inch above the grid plate wire.

With drainage pipe valve 56 closed, clean water is fed through intake 55 up through pipe 53 and flows through the grid plate 49 into the surrounding trough 52. The purpose of this step is to wash the grid plate wire of any adhering fibres possibly remaining from the previous sheet-forming cycle. The trough receiving the overflow drains through pipes 59 into sump 58 from which it flows to sewer through an outlet hole 145.

After about a 5-second washing period and with water still flowing into intake 55, the member 44 is automatically lowered (by means of a programmed lowering step of column 46) onto base 50 with the gasket ring 60 forming a circular seal between grid plate 49 and member 44.

Member 44 is now partially filled with water. When the water level is about halfway up, valve 43 opens, thus emptying the measured volume of dilute pulp suspension in measuring pot 33. The latter is simultaneously washed down by spray nozzle 48 as previously described.

When the level in member 44 reaches the 350 mm. mark above the grid plate wire, level controller 62 acts to close water intake or water supply pipe 55. Low pressure air is then automatically fed to manifold 63 through air intake or air supply pipe 64. From the manifold, air is distributed uniformly through port holes 63a into the member. The air issuing from these holes bubbles through the very dilute suspension in the member and acts to agitate this suspension.

After approximately a 5-second agitation period, the air is cut off and a pause of about 5 seconds occurs during which time the surface of the suspension becomes almost motionless. Drainage pipe valve 56 is then automatically fully opened to allow the water of the suspension to drain through the grid plate, down pipe 53 and into the overflow receiver 57. During this drainage period, the pulp fibres are retained on the wire to form a mat. The overflow from the top of receiver 57 (which is 800 mm. below the wire) empties into sump 58 from which it is sewered through outlet 145.

The drainage period is continued until substantially all the water is drained and the level in receiver 57 drops about 10 mm. below the top thereof by means of a small hole 146 located in the wall thereof. This permits the float of detector 65 to sense the termination of the drainage period and to re-energize the programming cycle. Lifting of the float of detector 65 results in interruption of an electrical control circuit (to be later referred to) in order to provide a sufficient drainage period for pulps of different drainage characteristics whereby the apparatus may be employed for treating such different pulps without resetting of its controls.

It will be apparent that a plurality of handsheets may be formed successively from each beaker sample.

At the completion of the drainage step, column 46 (and all elements attached to it including member 44) is raised about one inch. Prior to this lifting action, heads 96 and 97 are in the position of FIGURE 1. This lifting action is to permit access of the couching head 96 to the formed sheet and thus, with the parts as illustrated in FIGURE 7, column section 68 is rotated counter-clockwise 90° to bring the couching head 96 directly over the wet sheet on grid plate 49. Preferably, exact positioning means for head 96 is provided and comprises, as shown in FIGURE 7, a locking detent 153 pivotally mounted on frame member 154 and receivable in a notch 155 in disc 91. Actuation of detent 153 is effected by means of a solenoid 156.

It will be understood that couching head 96 in the position just described will be carrying a blotter 102 which it will have picked up in station (1).

Air pressure in chamber 69 is now released which causes column 46 and member 44 to drop. This brings the blotter held by the couching head 96 against the wet web already formed on the grid plate. The structure described is such that uniform contact with the whole area of the web is assured.

During the period of contact, which is about 1 second, the vacuum is maintained in couching head chamber 98 and low air pressure is applied below grid plate 49 through air inlet 54. This action facilitates couching of the wet web onto the blotter.

As previously indicated, while couching head 96 is in couching position, plate transfer head 97 is directly over the plate feeder 138. During the couching period, low air pressure is applied inside cylinder 142 to raise table 139 and a stack of plates 131 to bring the topmost plate against head 97. Vacuum is then applied to chamber 133 to hold the topmost plate in recess 130. As soon as a plate has been so located, air pressure in cylinder 142 is released to lower the table 139 and the remaining stack of plates thereon.

At the end of the simultaneous couching and plate transfer steps, column 46 and its attached components is raised to its upper position. The wet web, couched onto blotter 102 on the couching head, is thus lifted off the wire of the grid plate.

Column section 68 is now rotated an additional 90° in a counter-clockwise direction in order to bring couching head 96 with the couched web and blotter directly over the sheet stacking compartment 147, and plate transfer head 97 with a plate 131 in its recess 130 directly over blotter feeder table 126 with a blotter 102 thereon. Column 46 is now lowered to bring surface 132 of head 97 into contact with the blotter on table 126. Vacuum is applied to chamber 135 in order to hold the blotter on surface 132. Thus, both a plate 131 and blotter 102 are now carried by suction on the head 97.

With column 46 in lower position, vacuum in chamber 98 of the couching head 96 is released simultaneously with the blotter pick-up step just described. This release of vacuum results in dropping of the couched web and blotter into the compartment 147.

Column section 68 now rotates 180° clockwise into its original position (FIGURE 1) with the plate transfer head 97 directly over the compartment 147. While in this position, vacuum in chambers 133 and 135 is released which permits both the blotter and plate carried by head 97 to drop into compartment 147 and directly onto a blotter which in turn overlies a wet web. These successive operations comprise one full cycle and provide a stack consisting of the couched web, the blotter employed in couching the web, a second blotter which acts as a press-filler, and a plate 131.

Figure 9:
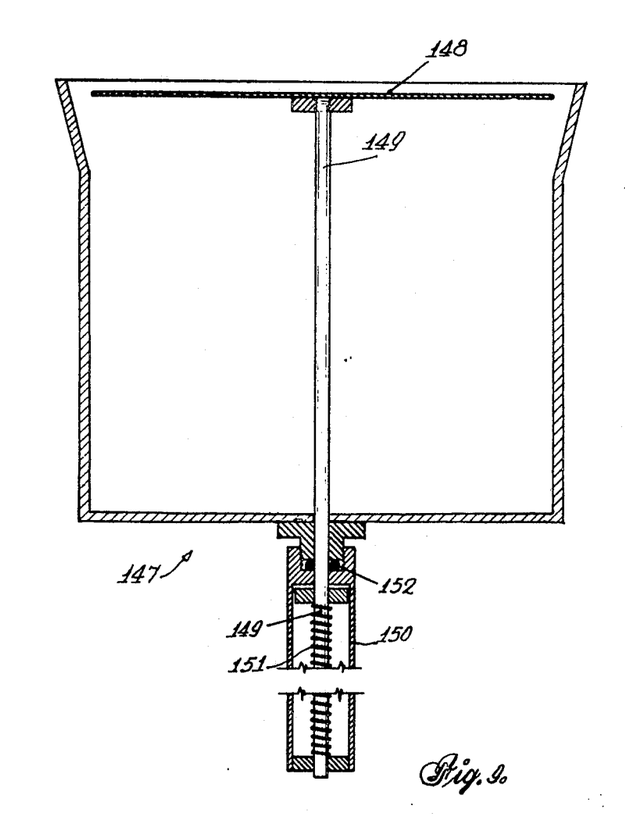
FIGURE 9 is a sectional elevation of a stack receiving device.

At the completion of sheet-making from all the samples supplied to the machine, the stack in compartment 147 is removed therefrom and the topmost plate on the stack is placed over a blotter on stacking table 148 for reception of the next series of samples. Upon inversion, the removed stack is ready for pressing in accordance with standard procedure.

Figure 10:
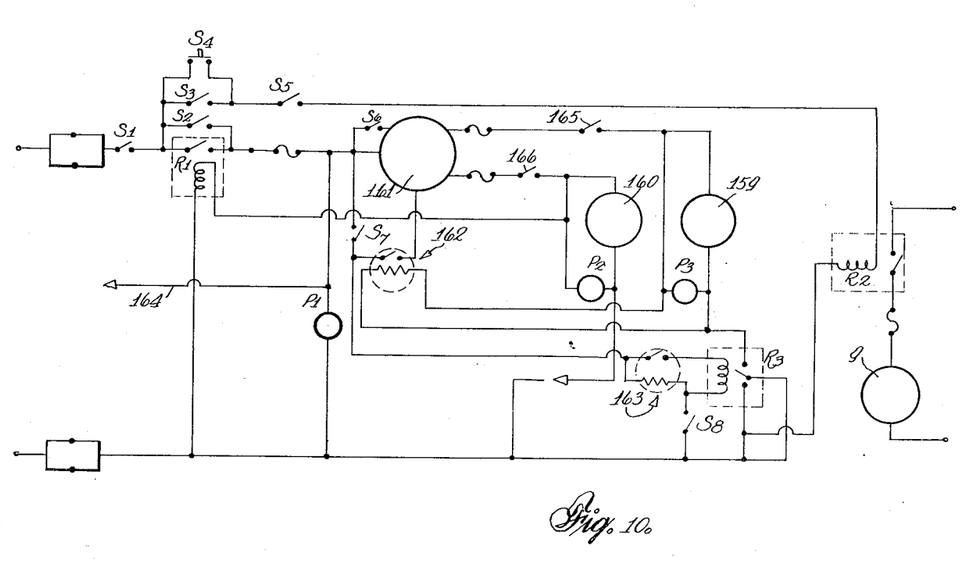
FIGURE 10 is a wiring diagram of an electrical power system for the apparatus.
Figure 11B:
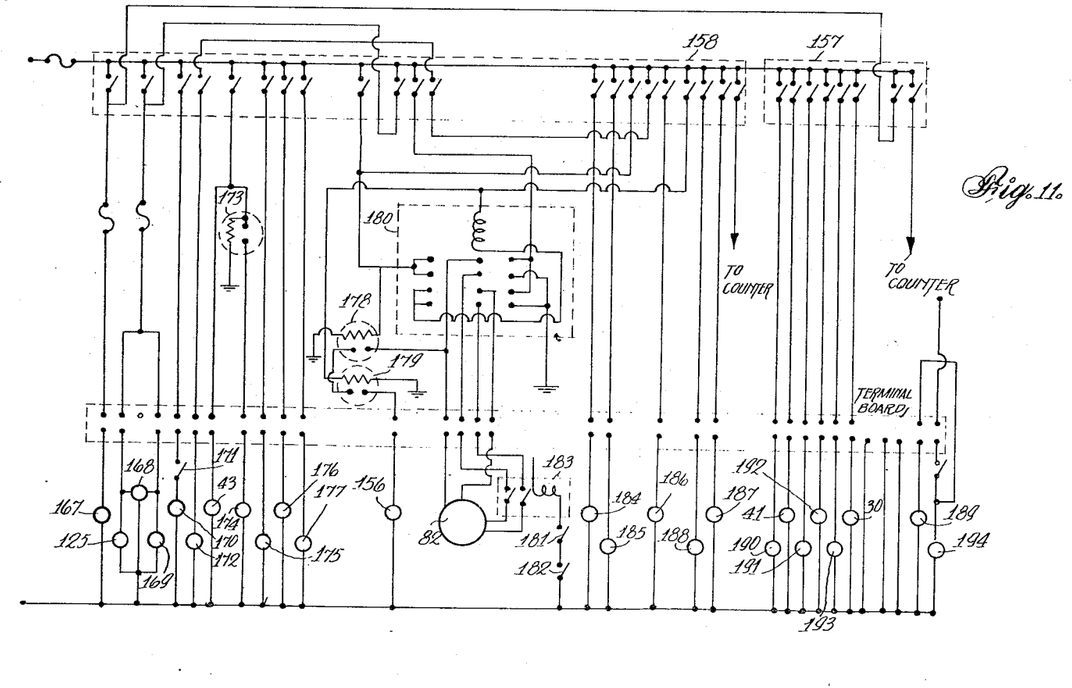
FIGURE 11 is a wiring diagram of a control system for the apparatus.

FIGURES 10 and 11 are illustrative of a suitable electrical wiring arrangement for control of the operation of the machine. The equipment is of generally conventional type and is based on the use of a small programmer 157 and a large programmer 158, which are schematically indicated in FIGURE 11.

FIGURE 10 includes in its circuit the conveyor motor 9, a motor 159 for the small programmer, a motor 160 for the larger programmer, a counter 161, delay relays 162 and 163, a connection 164 to a vacuum pump relay, and manually controlled switches 165 and 166. The following elements are also included in the circuit, as illustrated:

$S_1$—main on-off switch
$S_2$, $S_3$—cutting switches for beaker conveyor operation
$S_4$—push button start switch
$S_5$—dumper piston 21 switch
$S_6$—counting cam switch
$S_7$—counting cam resetting switch
$S_8$—beaker switch 18
$R_1$—power put relay
$R_2$—conveyor motor relay
$R_3$—ratchet relay
$P_1$—main switch pilot light
$P_2$—large programmer pilot light
$P_3$—small programmer pilot light FIGURE 11 also includes a schematic representation of the following elements:

stock pump 167
blotter motor 125
blotter positioner and stopper solenoids 168
valve 169 controlling operation of blotter piston 106
main water supply valve 170
switch 171 controlling water level in member 44
valve 172 controlling supply of air to pipe 66
delay relay 173
valve 43 of pot 33
valve 174 controlling flow of spray water in pipe 47
valve 175 controlling supply of air to air bubbling manifold 63
control valve 176
vacuum control valve 177 in hose 99
solenoid 156
delay relay 178
delay relay 179
column motor 82 reversing relay 180
column motor 82
column motor positioning switch 181
column motor interlock switch 182
column motor control relay 183
vacuum control valve 184 in hose 134
valve 185 controlling intake of plate cylinder 142
valve 186 controlling vacuum in chamber 136
control valve 187 valve 188 in air inlet 54
vacuum brake valve 189
filling valve 190 for water tank 28
stock tank drain valve 41
valve 191 controlling wash water in pipe 40
valve 192 controlling vacuum in line 17
valve 193 controlling operation of dumper piston 21
drain valve 30
blotter retainer solenoid 194

As shown in FIGURE 1, electrical power is delivered to the machine by connection 195, clean water is provided by means of supply pipe 196, and air under pressure through line 197. The low pressure air required in various steps as described is obtained from line 197 by means of pressure reducing valve 198 and air pressure indicator 199. The vacuum applied in various phases of the operation by means of the vacuum pump in the cabinet is indicated in the vacuum indicator 200. The programmers 157 and 158 are located on a remotely positioned control panel linked electrically to the machine by means of cable 201.

Referring to FIGURES 12 to 16, a modification is shown wherein the stations are arranged in a straight, rather than a circular path.

The machine includes a platform 202 having arranged thereon in a straight path a web forming station 203, a blotter feeding station 204, a plate feeding station 205, and a stack depositing station 206. The path is defined by a pair of parallel tracks 207.

Figures 15, 16, 17:
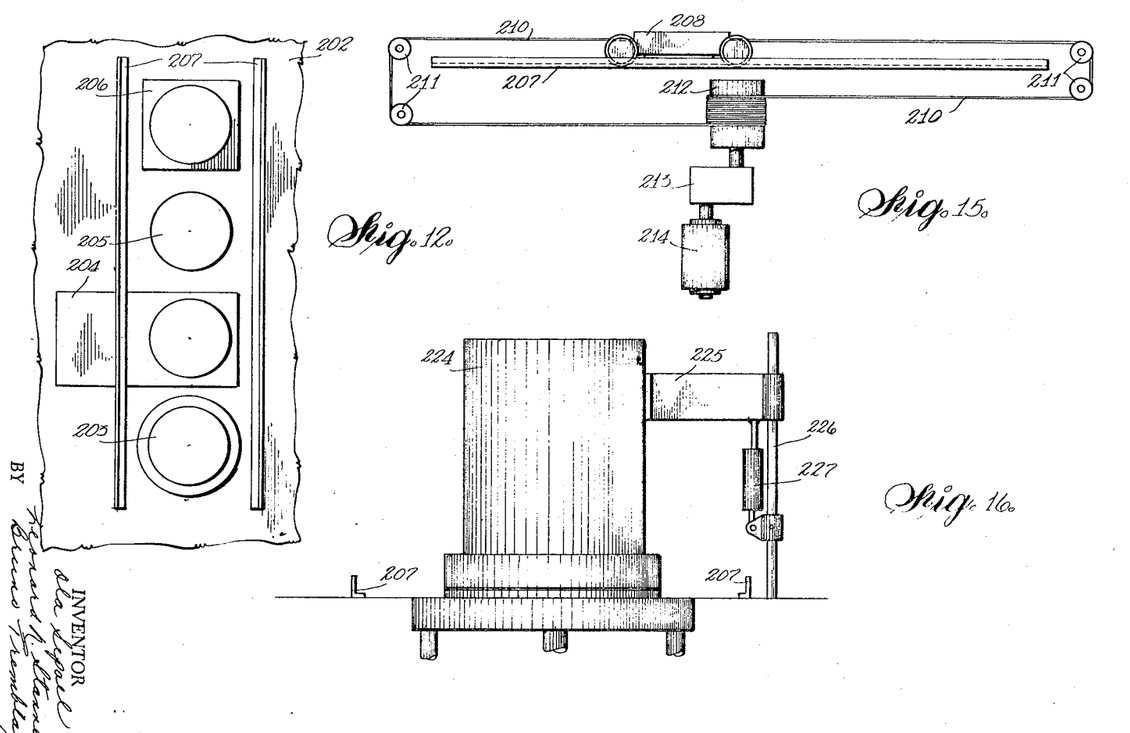
FIGURE 15 is a side elevation of a shuttle driving mechanism.
FIGURE 16 is a side elevation of a sheet mould raising and lowering mechanism.

A shuttle 208 is mounted on the tracks by means of wheels 209. Suitable power means is provided to move the shuttle from one to another of positions overlying the respective stations. As shown in FIGURE 15, such power means may comprise a flexible cable 210 attached to shuttle 208 and running on idler pulleys 211. A cable wind-up drum 212 is driven through a reduction gear mechanism and clutch 213 by a reversing electric motor 214.

Figure 13:
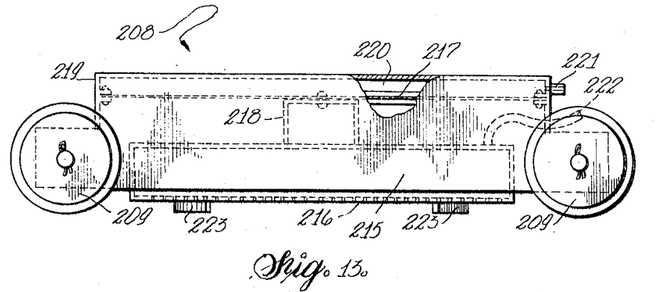
FIGURE 13 is a side elevation of a shuttle employed in the modification of FIGURE 12.
Figure 14:
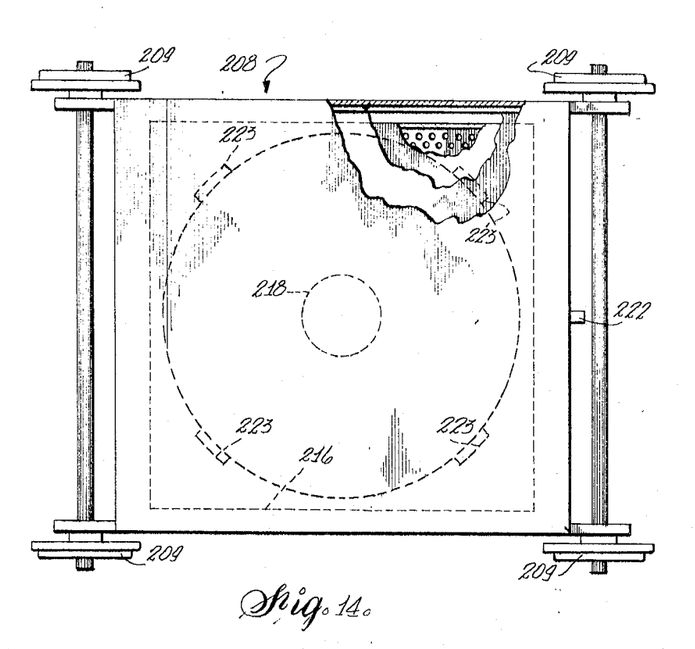
FIGURE 14 is a plan view of the shuttle of FIGURE 13.

Shuttle 208 is provided with blotter and plate transfer means comprising a housing 215 having a perforated deck 216. The housing is mounted on a flexible diaphragm 217 by means of brackets 218. Diaphragm 217 is carried by a frame member 219 and constitutes one wall of a chamber 220. Chamber 220 has an air inlet 221. Housing 215 has a vacuum connection 222. The deck 216 may be provided with plate-engaging guides 223.

Referring to FIGURE 16, a modified raising and lowering mechanism for the cylindrical sheetmaking member is therein illustrated. Member 224 corresponds to member 44 in the modification of FIGURES 1 to 11. Member 224 is carried by a bracket 225 slidably mounted on a vertical post 226 and movable thereon by means of an air cylinder 227 connected to bracket 225.

In a conventional procedure for forming a handsheet for physical testing, a standard bone dry sheet weight of 1.20±0.06 gms. corresponding to a basis weight of 60±3 gm./m² is specified. These sheet specifications are achieved by forming the sheet from a dilute 0.15% solids pulp suspension using 800 ml. of the latter plus, in some cases, additional volume to account for losses through the wire.

The machine of the present invention is capable of producing handsheets having a wide range of basis weights including the value of 60 gms./m.² corresponding to the standard sheet weight. In order to achieve the latter, the machine is so designed that when a 7 gms. bone dry pulp sample contained in a 1000 ml. suspension is supplied to the machine in each beaker, the automatic dilution in mixing tank 27 from dilution tank 28 provides a dilute suspension of 0.15% consistency. The necessary volume of dilute suspension of 800 ml. or more needed for each sheet is provided by pot 33 which has the adjustable sleeve 37 for fixed volume adjustment.

Because of the fixed volumes and dilutions used in the operations carried out by the machine, clearly the bone dry weights of sheets formed will depend upon the consistency of the 1000 ml. sample supplied to the machine in a beaker. Consistency determinations of samples fed to the machine can therefore be calculated from bone dry weighings of sheets formed. Thus, the apparatus can be employed for the forming of handsheets not only for physical testing of pulp but also for the determination of consistency of pulp suspensions supplied at a fixed volume to the machine.

The machine described may be employed as a useful laboratory or "off-line" automatic sheetmaking apparatus for forming handsheets from pulps for physical testing.

The machine may also be employed as an "on-line" apparatus in conjunction with mill operations to provide an automatic means for periodic sampling of pulp suspensions either for pulp quality evaluation or consistency determinations for control work purposes.

For pulp evaluation purposes, it is visualized that periodic "on-line" sheetmaking can be achieved by tapping and delivering a fixed volume of consistency-regulated pulp suspension from the mill supply line and automatically diluting it to 0.15% consistency in the mixing tank prior to sheet forming operations. Additional accessories such as timer operated valves and feed lines to the machine are all that would be required for "on-line" sampling. For "on-line" consistency determination, it is only necessary to provide automatic sampling and delivery of 1000 ml. of suspension and obtaining the bone dry weights of sheets formed.

We claim:

1. Apparatus for evaluating papermaking pulps which comprises
   (a) a tank for successive reception of stock samples, and
   (b) means for producing a test sheet from each of said stock samples comprising
       (i) a supporting base having a drainage chamber therein,
       (ii) a drain pipe having a valve therein leading from said chamber,
       (iii) a grid plate seated on said base in overlying relation to said chamber,
       (iv) a wire screen resting on said grid plate,
       (v) an open-ended cylindrical member having a substantially uniform interior cross-sectional area and an open end axially aligned with and seated on said screen and grid plate,
       (vi) the area of said grid plate and screen being at least coextensive with said area of said cylindrical member,
       (vii) a measuring pot having a pipe connection leading to said cylindrical member for supplying, by gravity, a fixed volume of stock thereto,
       (viii) a pipe connection leading from said tank to said measuring pot for filling said measuring pot with stock from said tank,
       (ix) means for transferring said stock from said tank through said pipe connection to said measuring pot,
       (x) means for opening said drainage pipe valve to initiate a drainage period during which substantially all the liquid in the stock in said cylindrical member drains by gravity through said screen, grid, chamber and drainage pipe and leaves a fiber mat on said screen, and
       (xi) means responsive to completion of said drainage period for separating said cylindrical member and screen from each other to permit removal of said fiber mat from said screen.

2. Apparatus for evaluating papermaking pulps as defined in claim 1, including
   (xii) means for washing said grid and screen comprising a water supply pipe connected to said drainage pipe between said drainage pipe valve and said chamber.

3. Apparatus for evaluating papermaking pulps as defined in claim 1, including
(xiii) means for agitating stock in said cylindrical member comprising an air supply pipe connected to said open-ended cylindrical member.

References Cited

UNITED STATES PATENTS 2,645,165   7/1953   Stevens   162—385 XR

OTHER REFERENCES

Stephenson, J. N., Preparation and Treatment of Wood Pulp, McGraw-Hill Book Company, Inc., 1950, pp. 992–1000.

S. LEON BASHORE, Primary Examiner

R. H. TUSHIN, Assistant Examiner

U.S. Cl. X.R.

162—198, 199, 218, 253, 262, 263, 264, 269, 275, 382